(12) United States Patent
Yuan et al.

(10) Patent No.: US 11,631,123 B2
(45) Date of Patent: Apr. 18, 2023

(54) VOICE SHOPPING METHOD, DEVICE AND COMPUTER READABLE STORAGE MEDIUM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Xiaochun Yuan, Beijing (CN); Linli Wang, Beijing (CN); Nanhua Lai, Beijing (CN); Zhiwu Yu, Beijing (CN); Xiaoliang Wang, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 773 days.

(21) Appl. No.: 16/479,841

(22) PCT Filed: Jan. 10, 2018

(86) PCT No.: PCT/CN2018/072138
§ 371 (c)(1),
(2) Date: Jul. 22, 2019

(87) PCT Pub. No.: WO2018/133723
PCT Pub. Date: Jul. 26, 2018

(65) Prior Publication Data
US 2021/0358020 A1 Nov. 18, 2021

(30) Foreign Application Priority Data

Jan. 23, 2017 (CN) .......................... 201710050620.X

(51) Int. Cl.
*G06Q 30/00* (2023.01)
*G06Q 30/0601* (2023.01)
(Continued)

(52) U.S. Cl.
CPC ......... *G06Q 30/0641* (2013.01); *G06F 3/167* (2013.01); *G06Q 30/0631* (2013.01);
(Continued)

(58) Field of Classification Search
CPC ............... G06Q 30/00; G06Q 30/0601; G06Q 30/0607; G06Q 30/0633; G06Q 30/0641
See application file for complete search history.

(56) References Cited

U.S. PATENT DOCUMENTS 5,832,212 A * 11/1998 Cragun ............... G06F 16/9535
714/37
6,336,099 B1 * 1/2002 Barnett .............. G06Q 30/0271
705/14.35
(Continued)

FOREIGN PATENT DOCUMENTS

| CN | 104616190 A | 5/2015 |
| CN | 104820928 A | 8/2015 |
| CN | 105931104 A | 9/2016 |

OTHER PUBLICATIONS

Ryumin, Dmitry, et al. "A multimodal user interface for an assistive robotic shopping cart." Electronics 9.12 (2020): 2093. (Year: 2020).*
(Continued)

*Primary Examiner* — Christopher B Seibert
(74) *Attorney, Agent, or Firm* — Oblon, McClelland, Maier & Neustadt, L.L.P.

(57) ABSTRACT

The present disclosure relates to a voice shopping method, device, and a computer-readable storage medium, and relates to the field of voice recognition technology. The method includes: receiving a query instruction from a user
(Continued)

by voice, and performing semantic recognition on the query instruction to determine one or more keywords of query content of the user; determining a search range of the keywords according to one or more shopping behavior records of the user; searching the keywords within the search range to obtain commodity information related to the query content, and performing voice output; and receiving an ordering instruction from the user by voice, and performing semantic recognition on the ordering instruction to determine whether an order is made.

15 Claims, 5 Drawing Sheets

(51) Int. Cl.
    *G06F 3/16*     (2006.01)
    *G10L 15/18*     (2013.01)
    *G10L 15/22*     (2006.01)
    *G10L 15/08*     (2006.01)

(52) U.S. Cl.
    CPC .......... *G10L 15/1815* (2013.01); *G10L 15/22* (2013.01); *G10L 2015/088* (2013.01); *G10L 2015/223* (2013.01)

(56) References Cited

U.S. PATENT DOCUMENTS

| | | | | |
|---|---|---|---|---|
| 7,310,601 | B2* | 12/2007 | Nishizaki | G10L 15/32 704/E15.049 |
| 8,359,642 | B1* | 1/2013 | Wurtenberger | G06F 21/10 726/1 |
| 8,875,257 | B1* | 10/2014 | Wurtenberger | H04N 21/4542 715/752 |
| 9,620,111 | B1* | 4/2017 | Bell | G06Q 30/02 |
| 10,885,091 | B1* | 1/2021 | Meng | G06F 16/24578 |
| 10,896,457 | B2* | 1/2021 | Arnett | G06Q 30/0643 |
| 2002/0048350 | A1* | 4/2002 | Phillips | G10L 15/06 704/E15.02 |
| 2002/0143550 | A1* | 10/2002 | Nakatsuyama | G10L 15/26 704/270.1 |
| 2004/0117384 | A1* | 6/2004 | Ray | G06Q 20/04 |
| 2005/0043940 | A1* | 2/2005 | Elder | G06F 16/24522 704/9 |
| 2005/0125301 | A1* | 6/2005 | Muni | G06Q 30/06 705/23 |
| 2007/0256093 | A1* | 11/2007 | Hiler | H04N 21/472 725/28 |
| 2008/0010170 | A1* | 1/2008 | Chan | G06Q 10/087 705/28 |
| 2008/0155614 | A1* | 6/2008 | Cooper | H04N 21/222 705/26.1 |
| 2008/0189187 | A1* | 8/2008 | Hao | G06Q 30/0633 705/26.8 |
| 2008/0208585 | A1* | 8/2008 | Ativanichayaphong | G10L 15/19 704/E15.021 |
| 2009/0240518 | A1* | 9/2009 | Borom | G06Q 30/0601 705/14.1 |
| 2010/0011322 | A1* | 1/2010 | Billmaier | H04N 21/4438 715/830 |
| 2011/0307280 | A1* | 12/2011 | Mandelbaum | G06Q 10/025 705/6 |
| 2012/0006891 | A1* | 1/2012 | Zhou | G06Q 30/06 235/380 |
| 2013/0024440 | A1* | 1/2013 | Dimassimo | G06F 16/3344 707/706 |
| 2013/0047115 | A1* | 2/2013 | Migos | G06F 3/0484 715/776 |
| 2014/0378204 | A1* | 12/2014 | Michel | G07F 17/329 463/17 |
| 2015/0212710 | A1* | 7/2015 | Gupta | G06Q 30/0641 715/765 |
| 2016/0350836 | A1* | 12/2016 | Burns | G06Q 30/0625 |
| 2017/0243107 | A1* | 8/2017 | Jolley | G06F 16/951 |
| 2018/0005305 | A1* | 1/2018 | Hirsch | G06Q 30/0625 |
| 2018/0217990 | A1* | 8/2018 | Kumar | G06F 16/3347 |
| 2018/0232443 | A1* | 8/2018 | Delgo | G06F 16/35 |
| 2019/0163437 | A1* | 5/2019 | Nagasaka | G06Q 30/06 |

OTHER PUBLICATIONS

Yoon, Yong-Wook, Byeong-Chang Kim, and Gary-Geunbae Lee. "Semantic-Oriented Error Correction for Voice-Activated Information Retrieval System." MALSORI 44 (2002): 115-130. (Year: 2002).*

Combined Chinese Office Action and Search Report dated Mar. 3, 2020 in Patent Application No. 201710050620.X (with English translation of Categories of Cited Documents), 8 pages.

International Search Report dated Apr. 13, 2018 in PCT/CN2018/072138 filed Jan. 10, 2018.

* cited by examiner

VOICE SHOPPING METHOD, DEVICE AND COMPUTER READABLE STORAGE MEDIUM

CROSS-REFERENCE TO RELATED APPLICATIONS

The present application is based on and claims priority to CN Patent Application No. 201710050620.X filed on Jan. 23, 2017, the disclosure of which is incorporated by reference herein in its entirety.

TECHNICAL FIELD

The present disclosure relates to the field of voice recognition technology, and in particular, to a voice shopping method, a voice shopping device, and a computer-readable storage medium.

BACKGROUND

In recent years, internet is more and more closely bonded with our daily life, especially in the field of E-commerce, and we have been accustomed to purchasing various commodity and services via network. For example, in Chinese market, many people obtain commodity such as electronic consumer products, daily general commodities, and telecommunication value-added services that are required in daily life via JD. COM E-commerce platform. Therefore, how to provide a more rapid and convenient interactive services for users becomes an important technical problem in the field of E-commerce at present.

Intelligent voice interaction is a new generation of interaction technology based on voice input, and a number of voice interaction devices come out based on such technology at present. The related art comprises intelligent speakers, SIRI assistant, iFLY voice assistant and the like. By using these devices, the user may perform basic interaction with an E-commerce platform only by voice input without complicated manual input, thereby providing convenience for the user.

SUMMARY

According to some embodiments of the present disclosure, a voice speech method is provided. The method comprises: receiving a query instruction from a user by voice, and performing semantic recognition on the query instruction to determine one or more keywords of query content of the user; determining a search range of the keywords according to one or more shopping behavior records of the user; searching the keywords within the search range to obtain commodity information related to the query content, and performing voice output; and receiving an ordering instruction from the user by voice, and performing semantic recognition on the ordering instruction to determine whether an order is made.

In some embodiments, semantic recognition on the query instruction is performed to determine a shopping scene in which the user is situated; and the step of determining the search range of the keywords comprises: determining the search range of the keywords according to the shopping scene and the shopping behavior records of the user.

In some embodiments, various historical shopping data systems of the user are determined as a search range of the keywords, wherein the shopping behavior records comprise historical orders, a shopping cart, recent concerns and search results; the historical shopping data systems are data systems corresponding to the shopping behavior records, and comprise a historical order data system, a shopping cart data system, a historical browsing data system and a searching data system.

In some embodiments, the historical shopping data systems corresponding to the shopping behavior records is determined as a search range of the keywords in the case where the shopping scene is that the user inquires commodity information in one or more shopping behavior records of the user; and an entire website is determined as a search range of the keywords in other cases.

In some embodiments, voice output is performed to prompt that the shopping website system is abnormal in the case where a shopping website system is abnormal, and voice output is performed to prompt the user for correct input voice in the case where a semantic recognition result of the query instruction is a wake-up word.

In some embodiments, voice output of a source, name, promotion information and a real-time price of related commodity of the query content is performed, and the user is prompted to confirm purchase in the case where the query content has matched data within the search range, and voice output is performed to prompt that related commodities of the query content are temporarily unavailable for purchase in the case where the query content does not have matched data within the search range.

In some embodiments, an order is automatically made and voice output is performed to prompt that the order is successfully made, in response to a semantic recognition result of the ordering instruction is to purchase; not automatically making the order and performing voice output to prompt that an order is not made, in response to a semantic recognition result of the ordering instruction is not to purchase; and not automatically making the order and performing voice output to prompt that the order is not successively made, to conclude the conversation, in response to a semantic recognition result of the ordering instruction that the user concludes a conversation or the user is time-out to make a response; other commodity are further recommended, in response to a semantic recognition result of the ordering instruction that the user is intended to change one commodity for purchase or inquiry; and new inquiry content is searched, in response to a semantic recognition result of the ordering instruction that a round of inquiry is restarted.

In some embodiments, voice output is performed to prompt that there are temporarily no more related commodities, in response to a semantic recognition result of the ordering instruction that there is still an intention to change one commodity for purchase or inquiry when the last commodity is recommended; and voice output is performed to prompt that this the order is over, in response to an initiative quit of the user.

In some embodiments, the commodity information comprises self-operation state, on-the-shelf state, payment after arrival of goods state, price state, discount state and a receiving address related inventory state, of commodity related to the query content, and the search keywords are at least one of commodity names inquired by the user and commodity discount items inquired by the user.

According to further embodiments of the present disclosure, a voice shopping device is provided. The voice shopping device comprises: a memory; a processor coupled to the memory, which is configured to execute the method for performing operations comprising the steps of: receiving a query instruction from a user by voice, and performing semantic recognition on the query instruction to determine one or more keywords of query content of the user; determining a search range of the keywords according to one or more shopping behavior records of the user; searching the keywords within the search range to obtain commodity information related to the query content, and performing voice output; and receiving an ordering instruction from the user by voice, and performing semantic recognition on the ordering instruction to determine whether an order is made.

In some embodiments, the step of determining a search range of the keywords comprises: performing semantic recognition on the query instruction to determine a shopping scene in which the user is situated; and determining the search range of the keywords according to the shopping scene and the shopping behavior records of the user.

In some embodiments, the step of determining a search range of the keywords comprises: determining various historical shopping data systems of the user as the search range of the keywords, wherein the historical shopping data systems are data systems corresponding to the shopping behavior records, and comprise a historical order data system, a shopping cart data system, a historical browsing data system and a searching data system, and the shopping behavior records comprise historical orders, a shopping cart, recent concerns and search results.

In some embodiments, the step of determining a search range of the keywords comprises: determining the historical shopping data systems corresponding to the shopping behavior records as the search range of the keywords, in a case where the shopping scene is that the user inquires commodity information in the shopping behavior records of the user; determining an entire website as the search range of the keywords in other cases.

In some embodiments, the voice shopping device further comprising: performing voice output to prompt that the shopping website system is abnormal, in the case where a shopping website system is abnormal; and performing voice output to prompt the user for correct input voice, in the case where a semantic recognition result of the query instruction is a wake-up word.

In some embodiments, the step of searching the keywords within the search range to obtain commodity information related to the query content, and performing voice output comprises: performing voice output of a source, name, promotion information and a real-time price of related commodity of the query content, and prompting the user to confirm purchase, in the case where the query content has matched data within the search range; and performing voice output to prompt that related commodities of the query content are temporarily unavailable for purchase, in the case where the query content does not have matched data within the search range.

In some embodiments, the step of performing semantic recognition on the ordering instruction to determine whether an order is made comprises: automatically making the order and performing voice output to prompt that the order is successfully made, in response to a semantic recognition result of the ordering instruction is to purchase; not automatically making the order and performing voice output to prompt that the order is not made, in response to a semantic recognition result of the ordering instruction is not to purchase; not automatically making the order and performing voice output to prompt that the order is not successively made, to conclude a conversation, in response to a semantic recognition result of the ordering instruction that the user concludes the conversation or the user is time-out to make a response; further recommending other commodity, in response to a semantic recognition result of the ordering instruction that the user is intended to change one commodity for purchase or inquiry; searching new inquiry content, in response to a semantic recognition result of the ordering instruction that a round of inquiry is restarted.

In some embodiments, the voice shopping device further comprising: performing voice output to prompt that there are temporarily no more related commodities, in response to a semantic recognition result of the ordering instruction that there is still an intention to change one commodity for purchase or inquiry when the last commodity is recommended; performing voice output to prompt that the order is over, in response to an initiative quit of the user.

In some embodiments, the commodity information comprises self-operation state, on-the-shelf state, payment after arrival of goods state, price state, discount state and a receiving address related inventory state, of commodity related to the query content, and the search keywords are at least one of commodity names inquired by the user or commodity discount items inquired by the user.

According to further embodiments of the present disclosure, a computer readable storage medium in which a computer program is stored is provided. The voice shopping method according to any one of the embodiments is implemented when the program is executed by a processor.

Other features and advantages of the present disclosure will become apparent from the following detailed description of exemplary embodiments of the present disclosure with reference to the accompanying drawings.

BRIEF DESCRIPTION OF THE DRAWINGS

The drawings described herein are used to provide a further understanding of the present disclosure and constitute a part of the present application. The illustrative embodiments of the present disclosure as well as the descriptions thereof, which are used for explaining the present disclosure, do not constitute improper definitions on the present disclosure. In the drawings.

DETAILED DESCRIPTION

Figure 1:
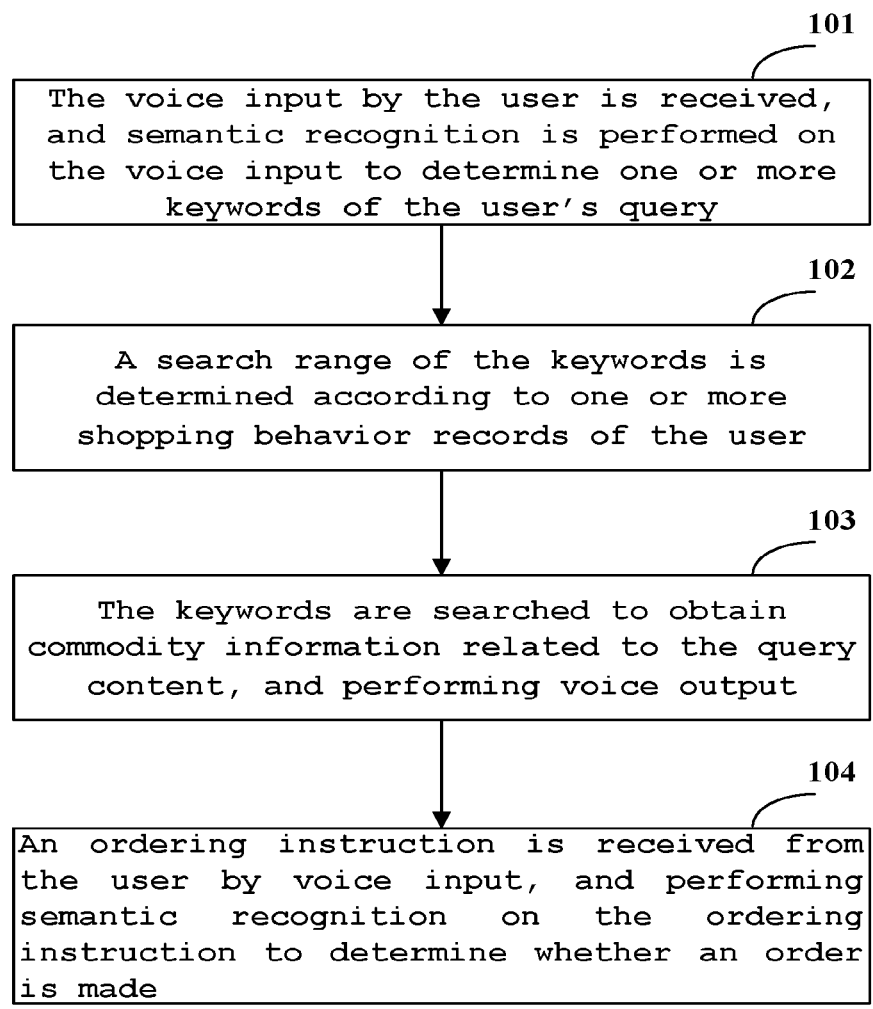
FIG. 1 shows an exemplary flow chart of a voice shopping method according to some embodiments of the present disclosure.

Various exemplary embodiments of the present disclosure will now be described in detail with reference to the accompanying drawings. It should be noted that: unless additionally specified, the relative arrangements, numerical expressions and numerical values of the components and steps expounded in these examples do not limit the scope of the present disclosure.

At the same time, it should be understood that, in order to facilitate the description, the dimensions of various parts shown in the drawings are not delineated according to actual proportional relations.

The following descriptions of at least one exemplary embodiment which are in fact merely descriptive, by no means serve as any delimitation on the present disclosure as well as its application or use.

The techniques, methods, and apparatuses known to a common technical person in the relevant art may not be discussed in detail, but where appropriate, techniques, methods, and apparatuses should be considered as part of the granted description.

Among all the examples shown and discussed here, any specific value should be construed as being merely illustrative, rather than as a delimitation. Thus, other examples of exemplary embodiments may have different values.

The inventors of the present disclosure have found that the above-described related art has the following problems: the related art mostly remains relying on some simple interconnection and splicing to link the user and the platform via internet, without personalized voice processing directed to the user, which results in that the voice input has a low recognition efficiency, and a poor user experience. Directed to at least one of the problems, the present disclosure proposes a technical solution of voice shopping, which can process the voice input according to personal shopping habits of the user, thereby improving the voice recognition efficiency and improving the user experience.

It should be noted that similar reference signs and letters present similar items in the following drawings, and therefore, once an item is defined in a drawing, there is no need for further discussion in the subsequent drawings.

FIG. 1 shows an exemplary flow chart of a voice shopping method according to some embodiments of the present disclosure.

As shown in FIG. 1, the method comprises: step 101 of determining one or more keywords; step 102 of determining a search range; step 103 of obtaining commodity information; and step 104 of determining whether an order is made.

At step 101, the voice input by the user is received, and semantic recognition is performed on the voice input to determine one or more keywords of the user's query content. The user may perform voice input of a commodity name intended to be purchased or inquired, for example "I want to buy mineral water" or "I want to buy NONGFU SPRING" and the like. In some embodiments, it is also possible to perform voice input of a commodity discount, for example "What products are in promotion recently" or "Are there any discounts for my concerns?" and the like. The keyword may be a commodity name or a commodity discount item name related to the query content.

In some embodiments, if the shopping website system is abnormal, the voice output prompts that the shopping website system is abnormal. If the result of semantic recognition is only a wake-up word, such as "Excuse me, Jingdong", the voice output prompts the user for correct input voice.

At step 102, a search range of the keywords is determined according to shopping behavior records of the user. The shopping behavior records may consist in historical order data, shopping cart data, historical browsing data or search data and the like, and the search range is a historical shopping data system corresponding to the shopping behavior records.

At step 103, the keywords are searched to obtain commodity information related to the query content, and performing voice output.

In some embodiments, voice output may be performed according to the obtained commodity information: "the razor has a discount of 5 yuan, and the current price is 20 yuan. Confirm purchase or change for another one?"

At step 104, an ordering instruction is received from the user by voice input, and performing semantic recognition on the ordering instruction to determine whether an order is made. For example, the user may confirm purchase or not by voice input.

In the above-described embodiment, the present disclosure determines the query content of the user by voice recognition, and determines the search range of the keyword according to shopping habits of the user. In this way, the search result conforms more to the real shopping intention of the user, and the search range is narrowed, thereby improving the voice recognition efficiency and improving the user experience.

Figure 2:
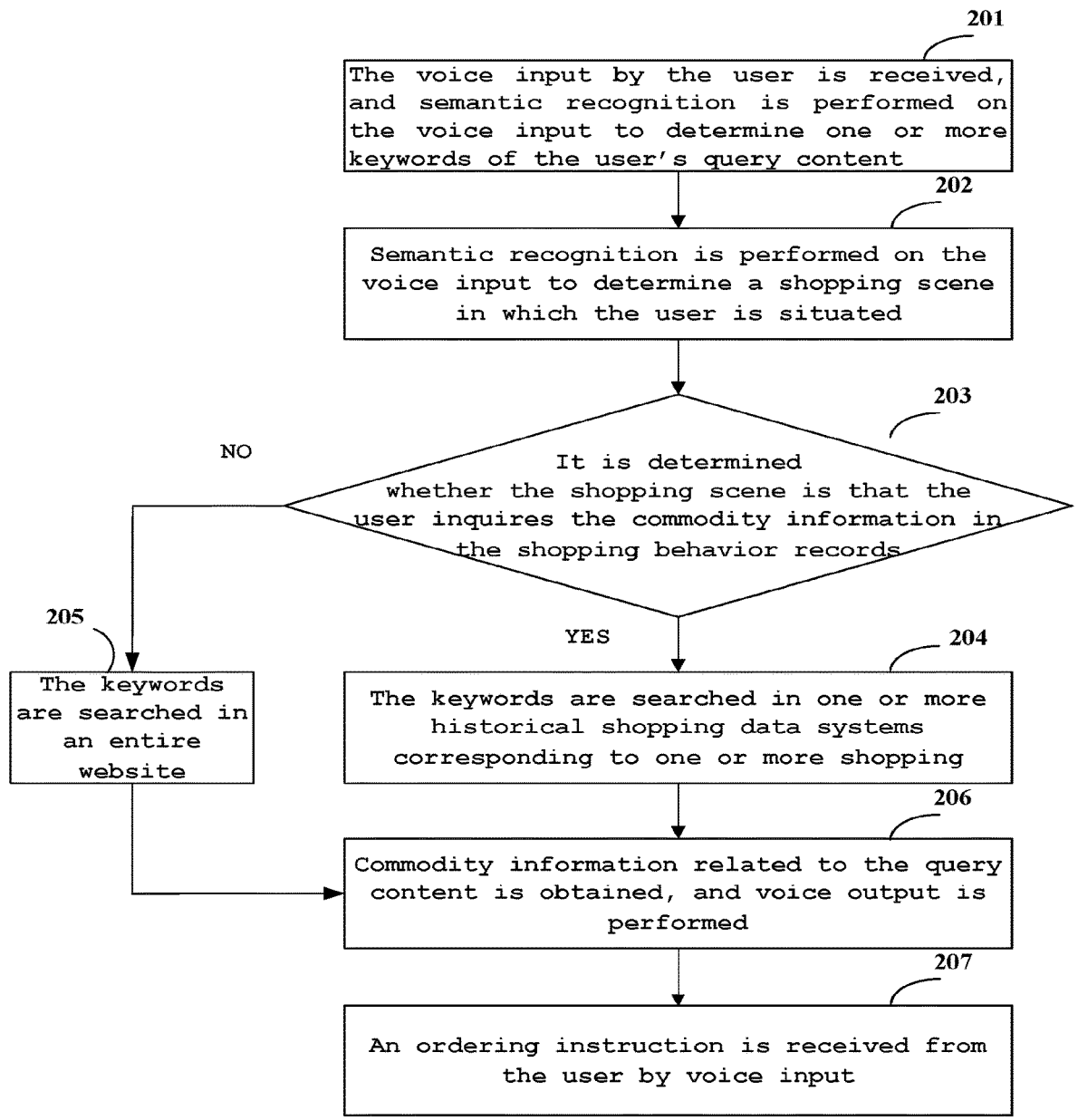
FIG. 2 shows an exemplary flow chart of a voice shopping method according to other embodiments of the present disclosure.

FIG. 2 shows an exemplary flow chart of a voice shopping method according to other embodiments of the present disclosure.

As shown in FIG. 2, the method comprises: step 201 of determining one or more keywords; step 202 of determining a shopping scene; step 203 of judging the shopping scene; step 204 and step 205 of searching for the keywords; step 206 of obtaining commodity information; and step 207 of determining whether an order is made.

At step 201, the voice input by the user is received, and semantic recognition is performed on the voice input to determine one or more keywords of the user's query content.

At step 202, semantic recognition is performed on the voice input to determine a shopping scene in which the user is situated.

At step 203, it is determined whether the shopping scene is that the user inquires the commodity information in the shopping behavior records. If so, the keywords are searched in one or more historical shopping data systems corresponding to one or more shopping behavior records (step 204). If not, the keywords are searched in an entire website (step 205).

In some embodiments, the user may input: "Are there any discounts for the commodities in my shopping cart?" or, "Are there any promotions in my latest views?". According to the voice input by the user, it may be determined that the shopping scene is that the user intends to inquire whether there are any discounts in the shopping cart or browsing record thereof. Further, it is also possible to make the historical browsing data system or the shopping cart data system as the search range to search keywords. The historical shopping data systems may consist in a historical order data system, a shopping cart data system, a historical browsing data system or a searching data system and the like.

In other embodiments, keywords may be searched according to a sequence of the historical order data system, the shopping cart data system, the historical browsing data system, and the search data system.

At step 206, commodity information related to the query content is obtained, and voice output is performed.

In some embodiments, voice output may be performed for the search results one by one according to a sequence of the historical order data system, the shopping cart data system, the historical browsing data system, and the search data system.

At step 207, an ordering instruction is received from the user by voice input, and performing semantic recognition on the ordering instruction to determine whether an order is made.

In the above-described embodiment, the present disclosure determines the search range of the query content according to shopping habits and shopping intentions of the user, to realize personalized voice shopping services directed to different users, thereby improving the voice recognition efficiency and improving the user experience.

Figure 3:
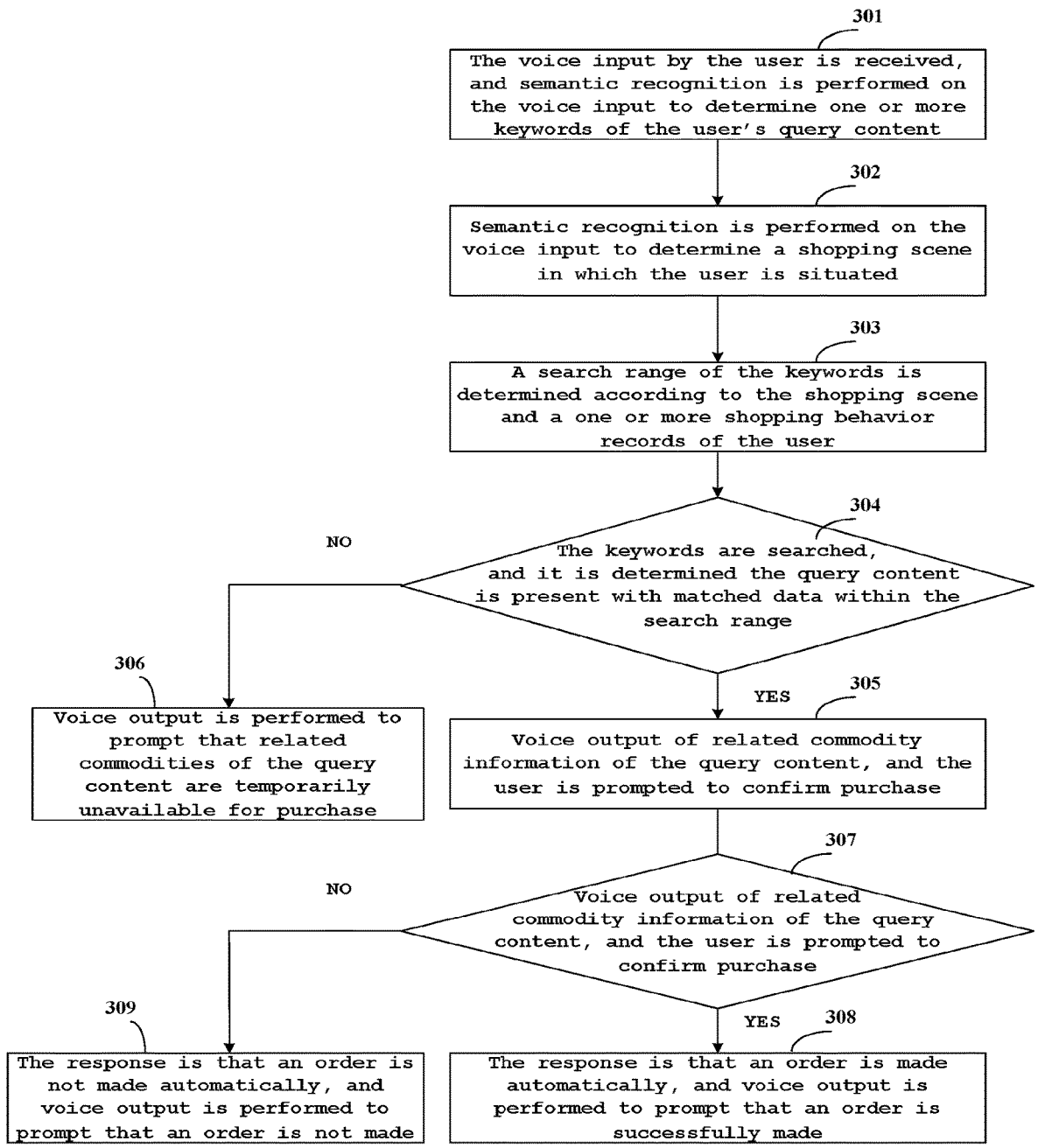
FIG. 3 shows an exemplary flow chart of a voice shopping method according to further embodiments of the present disclosure.

FIG. 3 shows an exemplary flow chart of a voice shopping method according to further embodiments of the present disclosure.

As shown in FIG. 3, the method comprises the steps that:

At step 301, the voice input by the user is received, and semantic recognition is performed on the voice input to determine one or more keywords of the user's query content;

At step 302, semantic recognition is performed on the voice input to determine a shopping scene in which the user is situated;

At step 303, a search range of the keywords are determined according to the shopping scene and one or more shopping behavior records of the user;

At step 304, keywords are searched, and it is determined the query content has matched data within the search range;

If so, performing voice output of related commodity information of the query content, and the user is prompted to confirm purchase (step 305);

If not, voice output is performed to prompt that related commodities of the query content are temporarily unavailable for purchase (step 306).

For example, the goods information comprises self-operation state, on-the-shelf state, payment after arrival of goods state, price state, discount state, a receiving address related inventory state and the like, of goods related to the query content.

In some embodiments, it is possible to sequentially inquire inventories in a receiving addresses set in the user's Client, a default address identified by the user and an initial receiving address set in the E-commerce platform. If the search results involve a plurality of historical shopping data systems, voice output may be performed according to a sequence of the historical order data system, the shopping cart data system, the historical browsing data system, and the search data system.

The method further comprises:

At step 307, it is determined whether a semantic recognition result of the user's voice input is to confirm purchase;

If so, the response is that an order is made automatically, and voice output is performed to prompt that an order is successfully made (step 308);

If not, the response is that an order is not made automatically, and voice output is performed to prompt that an order is not made (step 309).

In some embodiments, if the user is time-out to make a response, for example a response is not received after 5 seconds, or the user's voice input is that the user concludes a conversation, the response is that an order is not made automatically and this conversation is concluded, and voice output is performed to prompt that an order is not successfully made. If the user's voice input is that the user intends to change one commodity for purchase or inquiry, the response is that other products are further recommended. If the user's voice input is to restart a round of inquiry, new inquiry content is searched.

In other embodiments, if the user's voice input is still an intension to change one commodity for purchase or inquiry when the last commodity is recommended, voice output is performed to prompt that there are temporarily no more related commodities. If there is an initiative quit of the user, voice output is performed to prompt that the order is over.

In the above-described embodiment, the present disclosure makes personalized searches directed to different users, thereby improving the voice recognition efficiency. Moreover, according to the ordering instruction of the user's voice input, an order is made automatically or a recommending operation is performed, thereby satisfying the requirement for the simplest shopping operations throughout the shopping procedure, and improving the user experience.

Figure 4:
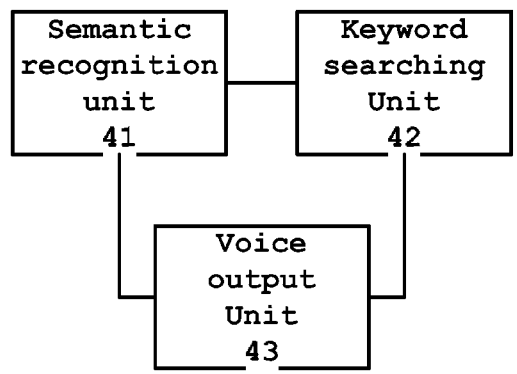
FIG. 4 shows an exemplary block diagram of a voice shopping device according to some embodiments of the present disclosure.

FIG. 4 shows an exemplary block diagram of a voice shopping device according to some embodiments of the present disclosure.

As shown in FIG. 4, the device comprises a semantic recognition unit 41, a keyword searching unit 42, and a voice output unit 43.

The semantic recognition unit 41 receives the user's voice input, and performs semantic recognition on the voice input to determine one or more keywords of the user's query content and an ordering instruction of the user. For example, the semantic recognition unit 41 may convert the received voice input into a corresponding text file. Then, the text file is processed to obtain a semantic analysis result, that is, one or more keywords. The keyword here may be a commodity name or a commodity discount item name inquired by the user.

The keyword searching unit 42 determines a search range of the keyword according to one or more shopping behavior records of the user, and searches the keyword within the search range to obtain commodity information related to the query content. The voice output unit 43 is used for voice output of the commodity information and related prompt information. For example, the keyword searching unit returns to the voice output unit 43, self-operation state, on-the-shelf state, payment after arrival of goods state, price state, discount state, a receiving address related inventory state and the like of related commodities as the query results. The voice output unit 43 processes the query results into a standardized text file, and finally converts it into a voice output.

In the above-described embodiment, the keyword search unit of the present disclosure determines the search range of the keyword according to shopping habits of the user, so that the search results conform more to the real shopping intention of the user. Moreover, in this way, the search range is narrowed, thereby improving the voice recognition efficiency and improving the user experience.

Figure 5:
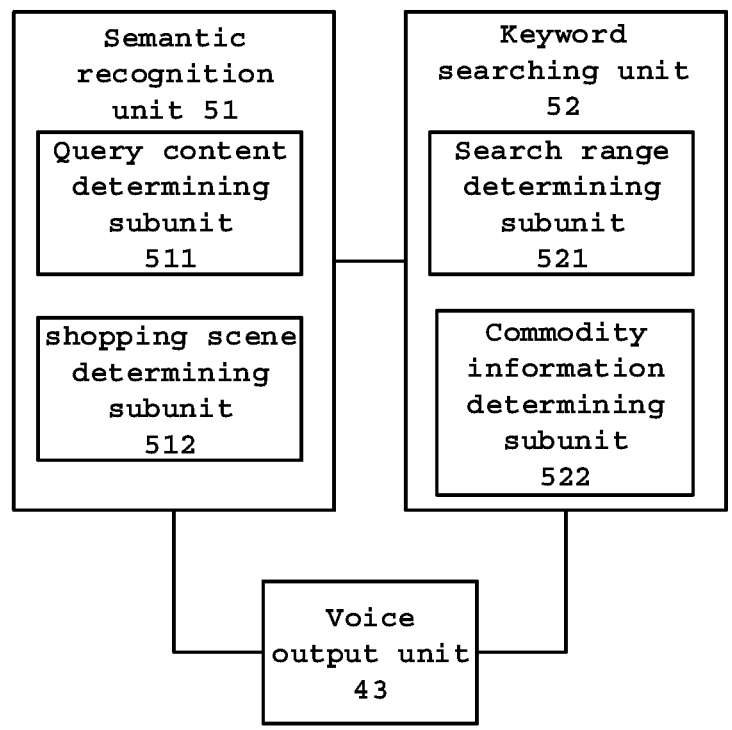
FIG. 5 shows an exemplary block diagram of a voice shopping device according to other embodiments of the present disclosure.

FIG. 5 shows an exemplary block diagram of a voice shopping device according to other embodiments of the present disclosure.

As shown in FIG. 5, the device comprises a semantic recognition unit 51, a keyword searching unit 52, and a voice output unit 43. The semantic recognition unit 51 comprises: a query content determining subunit 511 and a shopping scene determining subunit 512. The keyword searching unit 52 comprises: a search range determining subunit 521 and a commodity information determining subunit 522.

The query content determining subunit 511 receives the user's voice input, and performs semantic recognition on the voice input to determine one or more keywords of the user's query content and an ordering instruction of the user. The shopping scene determining subunit 512 performs semantic recognition on the voice input to determine a shopping scene in which the user is situated. For example, the user perform voice input that "Are there any discounts for the mobile phone in my shopping cart?" Then, the query content determining subunit 511 identifies that the keyword consists in a commodity name: "mobile phone" and a discount item name: "discounts". The shopping scene identified by the shopping scene determining subunit 512 is that: the user specifies to query a keyword in the shopping cart data system.

The search range determining subunit 521 determines a search range of the keyword according to the shopping scene and the shopping behavior records of the user. The commodity information determining subunit 522 searches the keyword within the search range to obtain commodity information related to the query content. For example, according to the above example, the search range determining subunit 521 may determine that the search range is the shopping cart data system. The commodity information determining subunit 522 searches such two keywords as "mobile phone" and "discounts" in the shopping cart data system, and sends the related information that is found to be matched to the voice output unit 43 so as to perform voice output. At the same time, the voice output unit 43 prompts the user to confirm purchase by voice, and the user inputs an ordering instruction by voice, so that the semantic recognition unit 51 performs semantic recognition on the ordering instruction.

Figure 6:
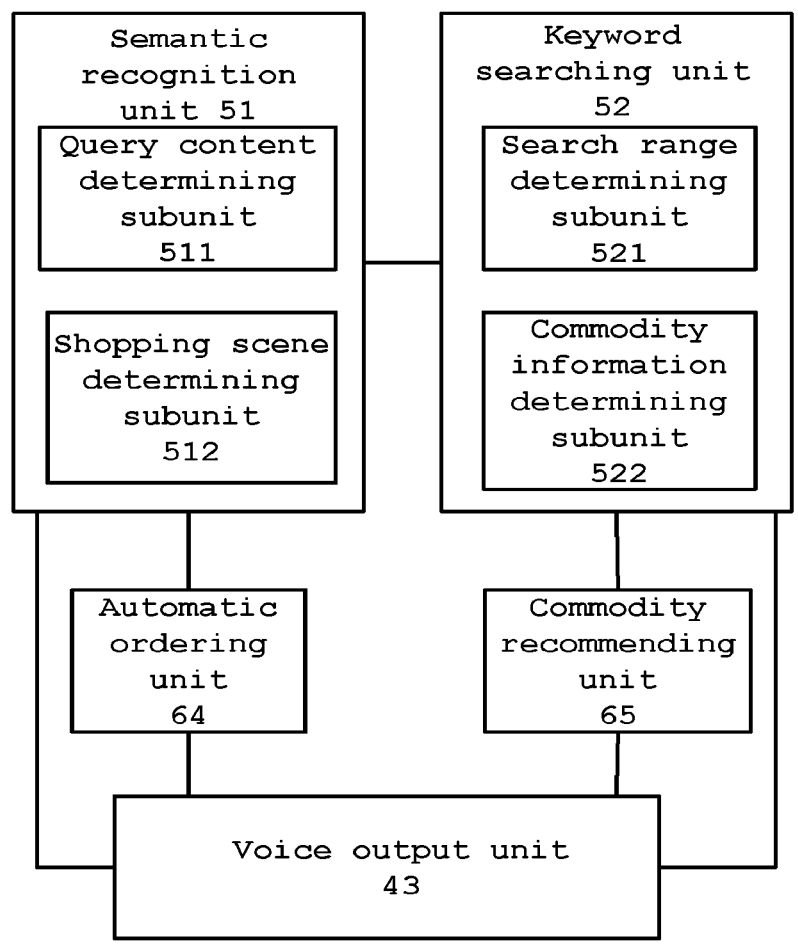
FIG. 6 shows an exemplary block diagram of a voice shopping device according to further embodiments of the present disclosure.

In some embodiments, for example, FIG. 6 shows an exemplary block diagram of a voice shopping device according to further embodiments of the present disclosure. The device further comprises: an automatic ordering unit 64 and a commodity recommending unit 65.

If the recognition result of the ordering instruction by the semantic recognition unit 51 is to purchase, the response of the automatic ordering unit 64 is that an order is made automatically, and the semantic recognition unit 51 outputs a prompt that an order is made successfully. For example, the purchased amount may be set to 1 by default when an order is made automatically. If the commodity information determining subunit 522 finds that there are such abnormal conditions that the commodity has been off-the-shelf, there is no stock available in the delivery address or the commodity price varies after the user confirms purchase, the voice output unit 43 prompts the user that an order is not made successfully together with the reason thereof.

If the recognition result of the ordering instruction by the semantic recognition unit 51 is not to purchase, the response of the automatic ordering unit 64 is that an order is not made automatically, and the semantic recognition unit 51 is informed to prompt the user that an order is not made. If the recognition result of the ordering instruction by the semantic recognition unit 51 is to change one commodity for purchase or inquiry, the response of the commodity recommending unit 65 is to further recommend other commodities, and inform the voice output unit 43 to output the next commodity information related to the inquiry content. If the identification result of the semantic recognition unit 51 is still an intention to change one commodity for purchase or inquiry when the last commodity is recommended by the commodity recommending unit 65, the voice output unit 43 prompts that there are temporarily no more related commodities. If there is an initiative quit of the user, the voice output unit 43 prompts that this order is over.

In the above-described embodiments, according to the historical shopping data and the shopping scene in which the user is situated, the present disclosure makes personalized searches directed to different users, thereby improving the voice recognition efficiency. Moreover, according to the ordering instruction of the user's voice input, an order is made automatically or an operation is recommended, thereby satisfying the requirement for the simplest shopping operations throughout the shopping procedure, and improving the user experience.

Figure 7:
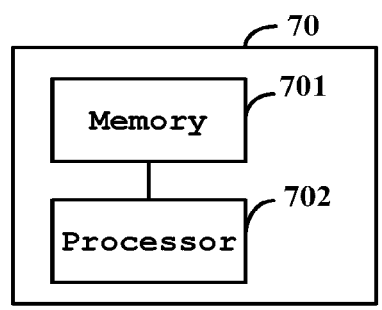
FIG. 7 shows an exemplary block diagram of a voice shopping device according to still further embodiments of the present disclosure.

FIG. 7 shows an exemplary block diagram of a voice shopping device according to still further embodiments of the present disclosure.

As shown in FIG. 7, the device 70 of the embodiment comprises: a memory 701; and a processor 702 coupled to the memory 701. The processor 702 is configured to perform the voice shopping method according to any one embodiment of the present disclosure based on instructions stored in the memory 701.

The memory 701 may comprise, for example, a system memory, a fixed non-volatile storage medium, and the like. The system memory stores, for example, an operation system, an application program, a boot loader, a database, and other programs.

In some embodiments, a computer readable storage medium in which a computer program is stored is provided. The voice shopping method according to any one embodiment described above is implemented when the program is executed by a processor. For example, the computer readable storage medium is a non-transitory computer readable storage medium.

Hereto, the voice shopping method, voice shopping device, and computer-readable storage medium according to the present disclosure have been described in detail. Some details well known in the art are not described to avoid obscuring the concept of the present disclosure. According to the above description, those skilled in the art would fully know how to implement the technical solutions disclosed herein.

The method and system of the present disclosure may be implemented in many manners. For example, the method and system of the present disclosure may be implemented by a software, hardware, firmware, or any combination of a software, hardware, and firmware. The above-described sequence of steps for the method is for illustrative purposes only, and the steps of the method of the present disclosure are not limited to the sequence specifically described above unless otherwise specifically stated. Moreover, in some embodiments, the present disclosure may also be embodied as programs recorded in a recording medium, which comprise machine readable instructions for implementing the method according to the present disclosure. Thus, the present disclosure also covers a recording medium storing programs for performing the method according to the present disclosure.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments may be made without departing from the scope and spirit of the present disclosure. The scope of the disclosure is defined by the following claims.

What is claimed is:

1. A voice shopping method, comprising:
   receiving a query instruction from a user by voice by a voice receiver of a voice interaction device;
   performing semantic recognition on the query instruction to determine one or more keywords of query content of the user by a semantic recognition unit of the voice interaction device;

determining a search range of the keywords by the semantic recognition unit according to one or more shopping behavior records of the user;
searching the keywords within the search range to obtain commodity information related to the query content by a keyword searching unit;
performing voice output by an intelligent speaker of the voice interaction device; and
receiving an ordering instruction from the user by voice by the voice receiver; and
performing semantic recognition on the ordering instruction to determine whether an order is made by the semantic recognition unit,
wherein determining the search range of the keywords by the semantic recognition unit comprises:
performing semantic recognition on the query instruction to determine a shopping scene in which the user is situated, and
determining the search range of the keywords according to the shopping scene and shopping behavior records of the user, including:
determining various historical shopping data systems of the user corresponding to the shopping behavior records as the search range of the keywords, in a case where the shopping scene is that the user inquires commodity information in the shopping behavior records of the user, the historical shopping data systems being data systems corresponding to the shopping behavior records, and
determining an entire website as the search range of the keywords in cases other than the case.

2. The voice shopping method according to claim 1, wherein the historical shopping data systems comprise a historical order data system, a shopping cart data system, a historical browsing data system, and a searching data system, and
the shopping behavior records comprise historical orders, a shopping cart, recent concerns, and search results.

3. The voice shopping method according to claim 1, further comprising:
performing voice output to prompt that a shopping website system is abnormal, in the case where the shopping website system is abnormal; and
performing voice output to prompt the user for correct input voice, in the case where a semantic recognition result of the query instruction is a wake-up word.

4. The voice shopping method according to claim 1, wherein searching the keywords within the search range to obtain commodity information related to the query content, and performing voice output comprises:
performing voice output of a source, name, promotion information and a real-time price of related commodity of the query content, and prompting the user to confirm purchase, in the case where the query content has matched data within the search range; and
performing voice output to prompt that related commodities of the query content are temporarily unavailable for purchase, in the case where the query content does not have matched data within the search range.

5. The voice shopping method according to claim 1, wherein performing semantic recognition on the ordering instruction to determine whether the order is made comprises:
automatically making the order and performing voice output to prompt that the order is successfully made, in response to a semantic recognition result of the ordering instruction is to purchase;
not automatically making the order and performing voice output to prompt that the order is not made, in response to a semantic recognition result of the ordering instruction is not to purchase;
not automatically making the order and performing voice output to prompt that the order is not successively made, to conclude a conversation, in response to a semantic recognition result of the ordering instruction that the user concludes the conversation or the user is time-out to make a response;
further recommending other commodity, in response to a semantic recognition result of the ordering instruction that the user is intended to change one commodity for purchase or inquiry; and
searching new inquiry content, in response to a semantic recognition result of the ordering instruction that a round of inquiry is restarted.

6. The voice shopping method according to claim 5, further comprising:
performing voice output to prompt that there are temporarily no more related commodities, in response to a semantic recognition result of the ordering instruction that there is still an intention to change one commodity for purchase or inquiry when the a commodity is recommended; and
performing voice output to prompt that the order is over, in response to an initiative quit of the user.

7. The voice shopping method according to claim 1, wherein
the commodity information comprises self-operation state, on-the-shelf state, payment after arrival of goods state, price state, discount state, and a receiving address related inventory state, of commodity related to the query content, and
the keywords are at least one of commodity names inquired by the user or commodity discount items inquired by the user.

8. A voice shopping device, comprising:
a memory; and
a processor coupled to the memory, which is configured to execute a method comprising:
receiving a query instruction from a user by voice by a voice receiver of a voice interaction device;
performing semantic recognition on the query instruction to determine one or more keywords of query content of the user by a semantic recognition unit of the voice interaction device;
determining a search range of the keywords by the semantic recognition unit according to one or more shopping behavior records of the user;
searching the keywords within the search range to obtain commodity information related to the query content by a keyword searching unit;
performing voice output by an intelligent speaker of the voice interaction device; and
receiving an ordering instruction from the user by voice by the voice receiver; and
performing semantic recognition on the ordering instruction to determine whether an order is made by the voice receiver,
wherein determining the search range of the keywords by the semantic recognition unit comprises:
performing semantic recognition on the query instruction to determine a shopping scene in which the user is situated, and determining the search range of the keywords according to the shopping scene and shopping behavior records of the user, including:
   determining various historical shopping data systems of the user corresponding to the shopping behavior records as the search range of the keywords, in a case where the shopping scene is that the user inquires commodity information in the shopping behavior records of the user, the historical shopping data systems being data systems corresponding to the shopping behavior records, and
   determining an entire website as the search range of the keywords in cases other than the case.

9. A non-transitory computer readable storage medium, in which a computer program is stored, wherein the voice shopping method according to claim 1 is implemented when the program is executed by a processor.

10. The voice shopping device according to claim 8, wherein the historical shopping data systems comprise a historical order data system, a shopping cart data system, a historical browsing data system, and a searching data system, and
   the shopping behavior records comprise historical orders, a shopping cart, recent concerns, and search results.

11. The voice shopping device according to claim 8, further comprising:
   performing voice output to prompt that a shopping website system is abnormal, in the case where the shopping website system is abnormal; and
   performing voice output to prompt the user for correct input voice, in the case where a semantic recognition result of the query instruction is a wake-up word.

12. The voice shopping device according to claim 8, wherein searching the keywords within the search range to obtain commodity information related to the query content, and performing voice output comprises:
   performing voice output of a source, name, promotion information and a real-time price of related commodity of the query content, and prompting the user to confirm purchase, in the case where the query content has matched data within the search range; and
   performing voice output to prompt that related commodities of the query content are temporarily unavailable for purchase, in the case where the query content does not have matched data within the search range.

13. The voice shopping device according to claim 8, wherein performing semantic recognition on the ordering instruction to determine whether the order is made comprises:
   automatically making the order and performing voice output to prompt that the order is successfully made, in response to a semantic recognition result of the ordering instruction is to purchase;
   not automatically making the order and performing voice output to prompt that the order is not made, in response to a semantic recognition result of the ordering instruction is not to purchase;
   not automatically making the order and performing voice output to prompt that the order is not successively made, to conclude a conversation, in response to a semantic recognition result of the ordering instruction that the user concludes the conversation or the user is time-out to make a response;
   further recommending other commodity, in response to a semantic recognition result of the ordering instruction that the user is intended to change one commodity for purchase or inquiry; and
   searching new inquiry content, in response to a semantic recognition result of the ordering instruction that a round of inquiry is restarted.

14. The voice shopping device according to claim 12, further comprising:
   performing voice output to prompt that there are temporarily no more related commodities, in response to a semantic recognition result of the ordering instruction that there is still an intention to change one commodity for purchase or inquiry when a last commodity is recommended; and
   performing voice output to prompt that the order is over, in response to an initiative quit of the user.

15. The voice shopping device according to claim 8, wherein
   the commodity information comprises self-operation state, on-the-shelf state, payment after arrival of goods state, price state, discount state, and a receiving address related inventory state, of commodity related to the query content, and
   the keywords are at least one of commodity names inquired by the user or commodity discount items inquired by the user.

* * * * *